(12) United States Patent
Black et al.

(10) Patent No.: US 8,083,471 B2
(45) Date of Patent: Dec. 27, 2011

(54) TURBINE ROTOR SUPPORT APPARATUS AND SYSTEM

(75) Inventors: Kenneth Damon Black, Travelers Rest, SC (US); Gregory Allan Crum, Mauldin, SC (US); Scott Michael Elam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1598 days.

(21) Appl. No.: 11/656,245

(22) Filed: Jan. 22, 2007

(65) Prior Publication Data
US 2010/0272558 A1 Oct. 28, 2010

(51) Int. Cl.
*F01D 25/16* (2006.01)

(52) U.S. Cl. ............ 415/142; 415/134; 415/213.1; 415/223

(58) Field of Classification Search ............ 415/134, 415/142, 213.1, 220, 223
See application file for complete search history.

(56) References Cited

U.S. PATENT DOCUMENTS

| | | | | |
|---|---|---|---|---|
| 4,050,660 | A * | 9/1977 | Eggmann et al. | 415/134 |
| 4,076,452 | A * | 2/1978 | Hartmann | 415/142 |
| 5,108,258 | A * | 4/1992 | Gros | 415/213.1 |
| 5,326,222 | A * | 7/1994 | Matyscak et al. | 415/213.1 |
| 5,447,025 | A * | 9/1995 | Rousselle | 415/213.1 |
| 6,447,267 | B1 * | 9/2002 | Varney et al. | 417/360 |
| 6,826,914 | B2 * | 12/2004 | Huster et al. | 415/213.1 |

\* cited by examiner

*Primary Examiner* — Igor Kershteyn
(74) *Attorney, Agent, or Firm* — Cantor Colburn LLP

(57) ABSTRACT

An apparatus to support a rotor of a turbine engine disposed upon a support surface is disclosed. The apparatus includes a housing, a rotor support bearing disposed within the housing, and a support leg in operable communication with the housing and in direct structural connection with the support surface.

16 Claims, 5 Drawing Sheets

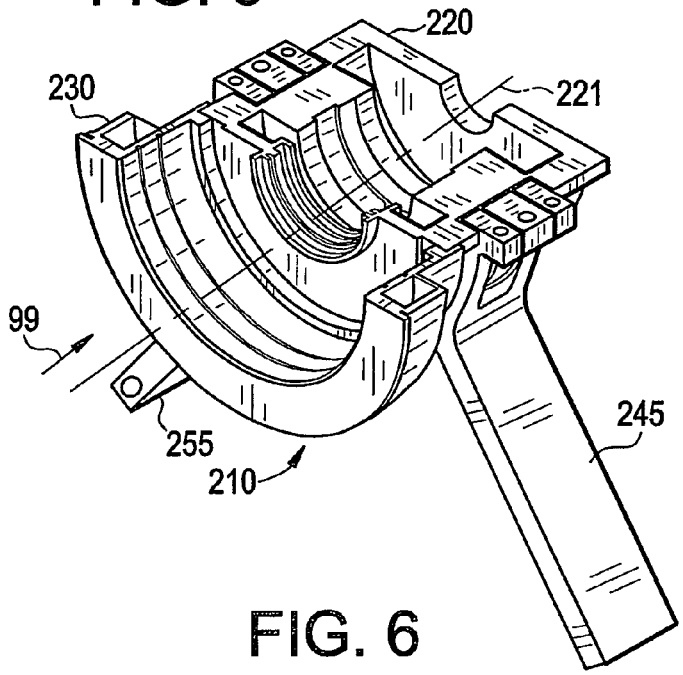
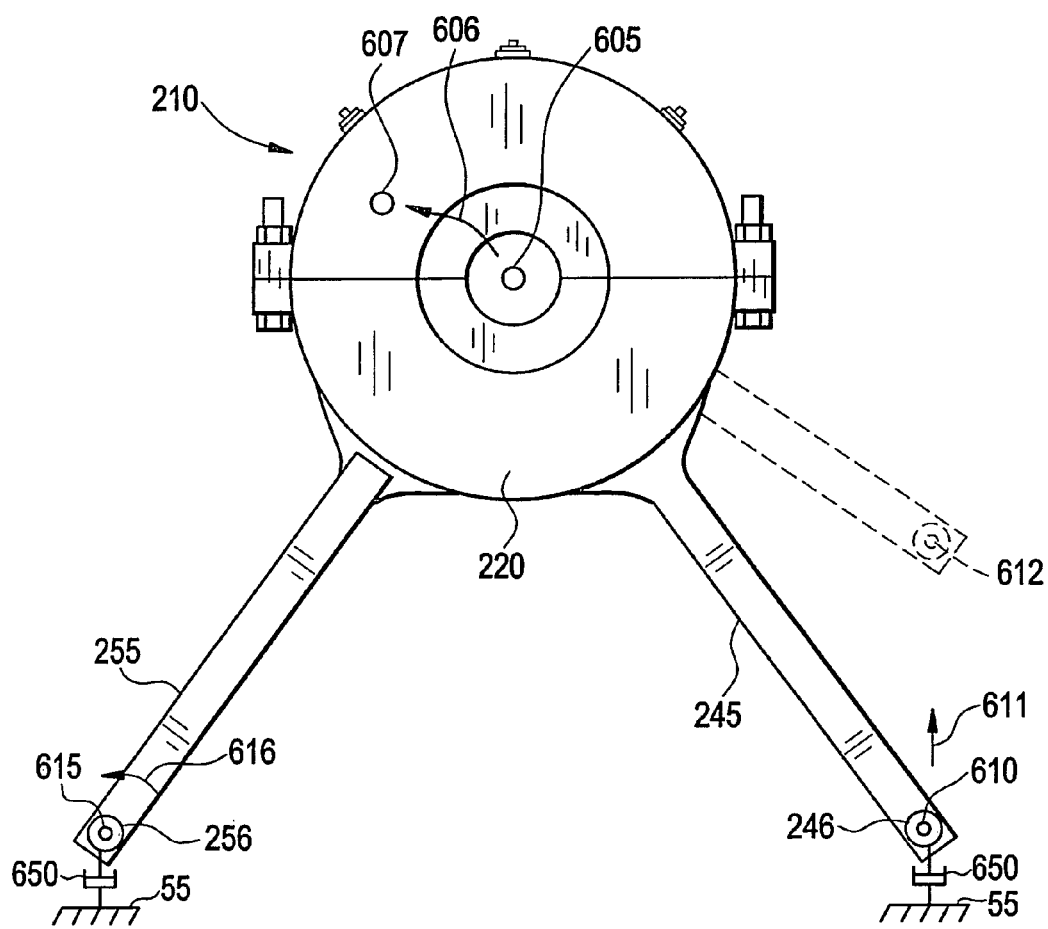

TURBINE ROTOR SUPPORT APPARATUS AND SYSTEM

BACKGROUND OF THE INVENTION

The present disclosure relates generally to turbines, and particularly to turbine rotor supports.

Current gas turbine engines utilize a bearing to support a rotor therein. The bearing is disposed within a bearing housing that is attached to an inner structure of an exhaust frame. The inner structure of the exhaust frame is located interior to an annular flow area of exhaust gases and is connected to an outer structure located exterior to the annular flow area of the gas turbine via a plurality of struts. The exhaust frame, including the inner and outer structure and struts, are made from structural steel and support the rotor and provide stiffness to the bearing housing. Each strut that projects from the inner structure to the outer structure creates an aerodynamic obstacle to a flow of exhaust, and an accompanying contribution to efficiency loss. Accordingly, an engineering compromise exists between rotor support stiffness and operational efficiency. Further, because the structural steel is not capable of withstanding turbine exhaust temperatures, cooling air is generally required. The cooling air is often provided via auxiliary blowers that are powered by the engine and therefore result in further engine efficiency losses.

Accordingly, there is a need in the art for a turbine rotor bearing support arrangement that overcomes these limitations.

BRIEF DESCRIPTION OF THE INVENTION

An embodiment of the invention includes an apparatus to support a rotor of a turbine engine disposed upon a support surface. The apparatus includes a housing, a rotor support bearing disposed within the housing, and a support leg in operable communication with the housing and in direct structural connection with the support surface.

Another embodiment of the invention includes a turbine engine system for disposing upon a support surface. The turbine engine system includes a stator, a rotor disposed within the stator, a rotor support bearing in operable communication with the rotor, a housing surrounding the rotor support bearing, and a support leg in operable communication with the housing and in direct structural connection with the support surface.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures:

FIG. 5 depicts a lower section view of a bearing support structure in accordance with an embodiment of the invention;

FIG. 6 depicts an end view of a bearing support structure in accordance with an embodiment of the invention.

DETAILED DESCRIPTION OF THE INVENTION

An embodiment of the invention provides a bearing support system to hold a downstream, or aft end of a rotor that is separate from a support system, also herein referred to as an exhaust frame, for a downstream, or aft end of a set of stator casings. As used herein, relative location indicated by the term "aft" shall indicate that the location of interest is disposed downstream, or toward an outlet with regard to a flow of exhaust gasses of a turbine engine. In an embodiment, one or more support legs support a bearing housing with large rings at an inner end of each leg. An outside of the bearing housing is machined such that the rings (which have a split joint) can be secured around the outer diameter of the housing in a slip-fit connection. In an embodiment, there are no struts or other mechanical means extending to the exhaust frame to hold an inner barrel disposed proximate the bearing housing. The inner barrel is supported by at least one of: being fixed to the bearing housing, and being fixed to the bearing support legs. In another embodiment, the inner barrel is an integral part of the bearing housing.

Figure 1:
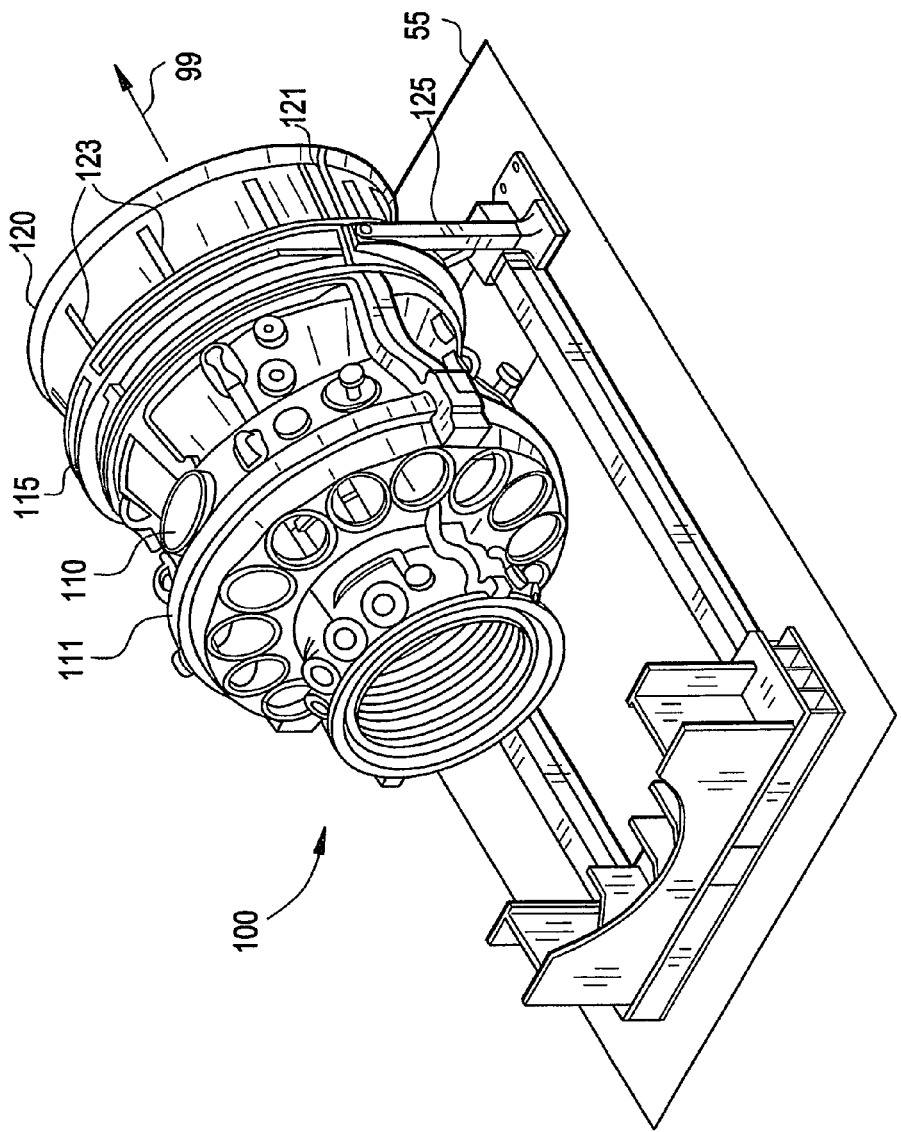
FIG. 1 depicts a downstream section of a turbine engine in accordance with an embodiment of the invention.

Referring now to FIG. 1, an embodiment of an aft section 105 of a turbine engine 100 is depicted. An inlet of the turbine engine 100 has been removed for illustration purposes. The aft section 105 includes a turbine shell 110, an exhaust frame 115, and an outer diffuser 120. A direction line 99 indicates a direction of flow of exhaust gases from the turbine engine 100 and defines an axial direction of the engine 100. The turbine engine 100 is mounted to a support surface 55. As used herein, the term "support surface" shall include any appropriate surface to which the turbine engine 100 may be mounted. The support surface 55 includes stationary surfaces that can be located on the ground, such as a foundation, for example, and also mobile surfaces, or structures that can be disposed within an airplane, ship, or helicopter, for example. The exhaust frame 115 supports the outer diffuser 120, as well as a stator (forward end not shown) of the turbine engine 100 via supports 125. The exhaust frame 115 while being made from a material, such as structural steel, that is capable of providing appropriate strength and stiffness, is not capable of withstanding a temperature of exhaust gasses from the turbine engine 100. The outer diffuser 120, however, is made from a material, such as stainless steel for example, that is capable of withstanding the temperature of exhaust gasses from the turbine engine 100, and thereby shields the exhaust frame 115 from exposure to the temperature of exhaust gasses. The exhaust frame 115 is configured with an axial length that terminates upstream of the outer diffuser 120 to reduce a quantity of heat transferred from the outer diffuser 120 to the exhaust frame 115. This configuration, as depicted in FIG. 1, allows for elimination of delivery of cooling air between the exhaust frame 115 and the outer diffuser 120. This thus reduces one inefficiency noted above. In an embodiment, the exhaust frame 115 is attached to the turbine shell 110. In another embodiment, the turbine shell 110 includes the exhaust frame 115.

In an embodiment, the outer diffuser 120 is a two-piece outer diffuser 120 including a horizontal joint 121. Use of the exhaust frame 115, configured with the axial length that terminates upstream of the outer diffuser 120, allows for access to the horizontal joint 121 of the two-piece outer diffuser 120 such that the horizontal joint 121 may include fasteners, such as bolts, to firmly clamp together the horizontal joint 121 of the two-piece outer diffuser 120. Firmly clamping the horizontal joint 121 of the two-piece outer diffuser 120 reduces leakage of surrounding air into the exhaust gasses, such leakage having the effect of reducing an efficiency of a subsequent combined cycle (wherein exhaust gas from the turbine engine 100 is used as a medium to increase a thermal energy of water or steam).

Figure 7:
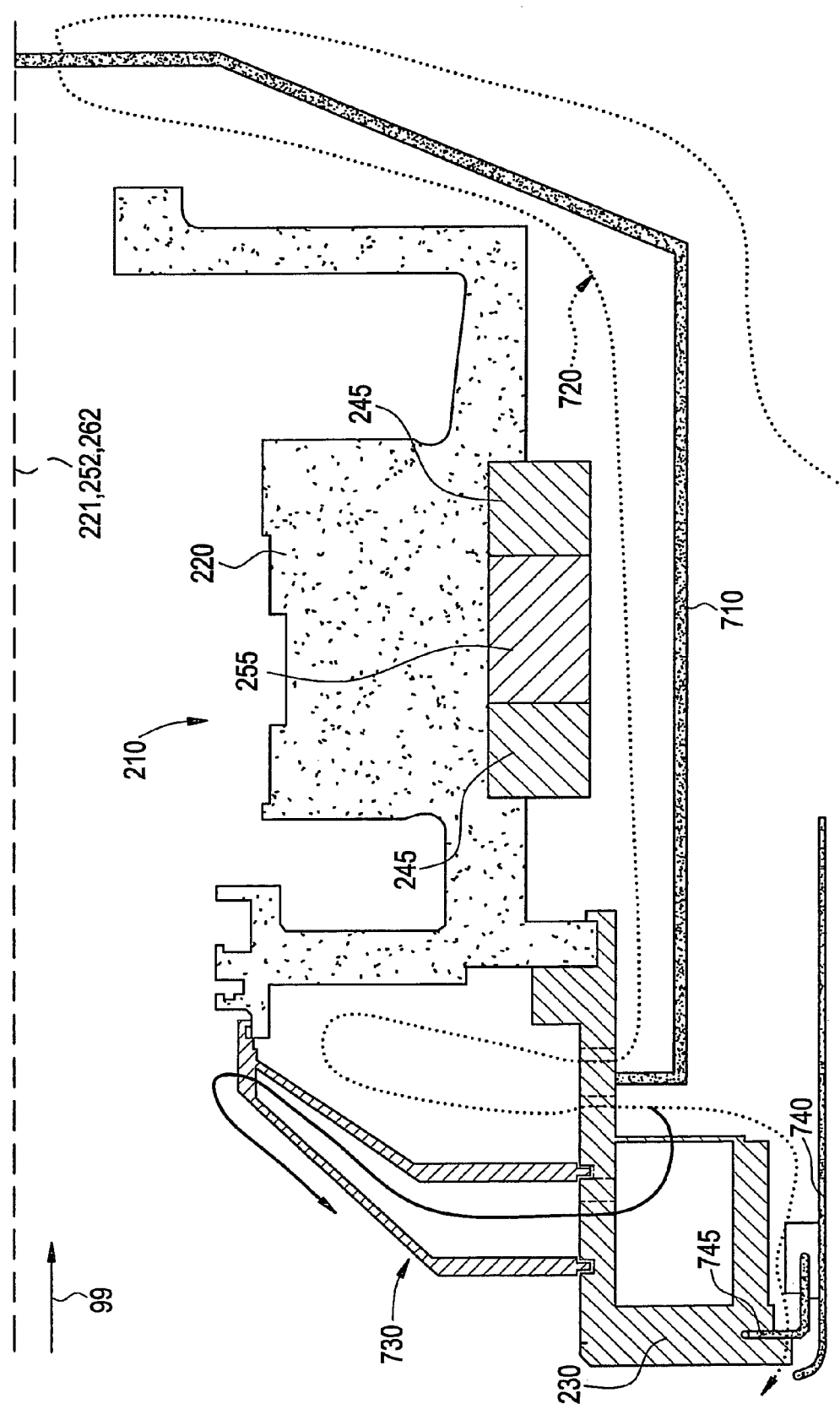
FIG. 7 depicts a side cross section view of the bearing support structure in accordance with an embodiment of the invention.

The outer diffuser 120 includes a set of airfoils 123 to provide structural support to an inner diffuser 740 (best seen with reference to FIG. 7). At least two of the airfoils 123 will incorporate bearing support legs, as will be described further below.

Figure 2:
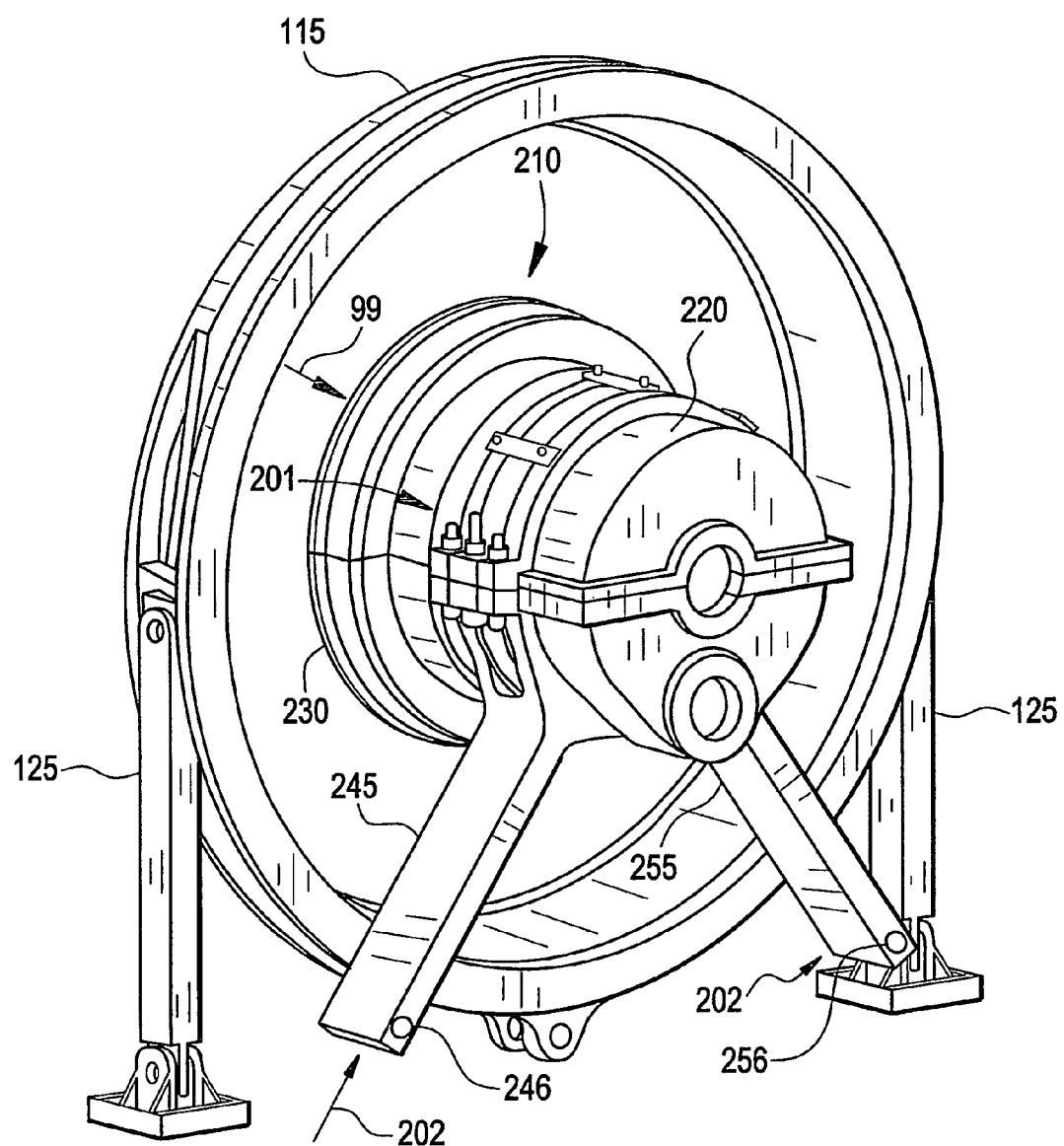
FIG. 2 depicts an end perspective view of a bearing support structure in accordance with an embodiment of the invention.

Referring now to FIG. 2, a view of the aft section 105 of the turbine engine 100 is depicted. It will be appreciated that the direction line 99 indicates the direction of flow of exhaust gasses. A bearing support structure 210 includes the bearing housing 220, an inner barrel 230, and bearing support legs 245, 255, also herein referred to as "a first support leg" and a "second support leg". The outer diffuser 120 and inner diffuser 740 are removed from the view of FIG. 2 for clarity. The bearing support structure 210 supports a rotor (not shown) of the turbine engine 100 via a bearing disposed at an aft end of the rotor within the bearing housing 220. A first location 201 of the support legs 245, 255 is in operable communication with, and supports, the bearing housing 220. The first location 201 of the support legs 245, 255 includes a structural interface to support the bearing housing 220. A second location 202 of the support legs 245, 255 is mounted to, or in direct structural connection with, the support surface 55. In an embodiment, the support legs 245, 255 are in direct structural connection with the support surface 55 independent of the exhaust frame 115. In an embodiment, the second location 202 of at least one of the bearing support legs 245, 255 includes a pivot support 246, 256 that allows the respective bearing support leg 245, 255 the freedom to rotate about the pivot support 246, 256.

While an embodiment has been described having two support legs 245, 255, it will be appreciated that the scope of the invention is not so limited, and that the invention will also apply to bearing support structures 210 having other numbers of support legs, such as one, three, four, or more, for example.

Figure 3:
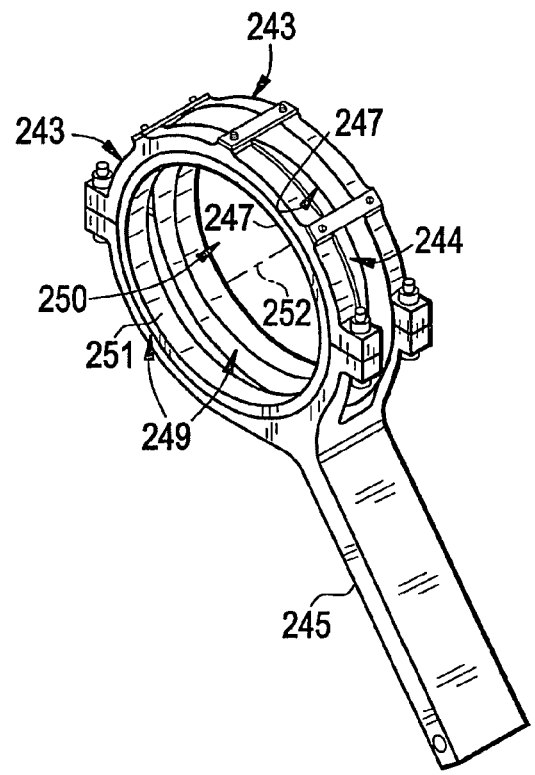
FIG. 3 depicts a top perspective view of a bearing support leg in accordance with an embodiment of the invention.

Referring now to FIG. 3, the support leg 245 is depicted. In an embodiment, the support leg 245, in conjunction with a structural interface 247, also herein referred to as a "first structural interface", such as clamps fastened to the support leg 245 for example, create rings 243 to retain the bearing housing 220. The rings 243 define a circular bore 250, also herein referred to as a "bore", having a centerline 252, the bore 250 dimensioned to match an outer diameter of the bearing housing 220. In an embodiment the bore 250 surfaces of the rings 243 include an anti-friction material 251. The anti-friction material 251 will reduce an amount of force required to cause rotation of the rings 243 relative to the bearing housing 220. In an embodiment, at least one flange surface 249, or side face, of the rings 243 that extends or projects radially outwardly from the bore 250 will include the anti-friction material 251. In an embodiment, the anti-friction material 251 includes bushing material, such as aluminum bronze, for example. The support leg 245 provides a plurality of pivots, such as the bore 250 and the pivot support 246, for example.

Figure 4:
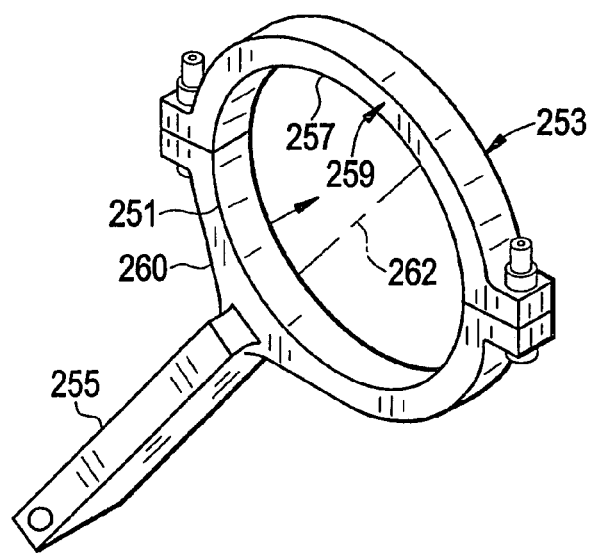
FIG. 4 depicts a top perspective view of a bearing support leg in accordance with an embodiment of the invention.

Referring now to FIG. 4, the bearing support leg 255 is depicted. The bearing support leg 255, in conjunction with a structural interface 257, also herein referred to as a "second structural interface", such as a clamp for example, creates a ring 253 to retain the bearing housing 220. The ring 253 defines a circular bore 260, also herein referred to as a "bore", having a centerline 262, the bore 260 dimensioned to match, and thereby retain, the outer diameter of the bearing housing 220. The ring 253 includes at least one flange surface 259, or side face that extends radially outwardly from the bore 260. An embodiment of the support leg 255 will include an anti-friction material 251 disposed upon a surface of the bore 260 of the ring 253. In an embodiment, at least one flange 259, will include the anti-friction material 251. The anti friction material 251 will reduce an amount of force required to cause rotation of the rings 253 to relative to the bearing housing 220. The support leg 255 provides a plurality of pivots, such as the bore 260 and the pivot support 256, for example.

Referring now to FIG. 3 in conjunction with FIG. 4, it will be appreciated that at least one of the structural interfaces 247, 257 and the respective support legs 245, 255 will include a separation space, such as a separation space 244 between the rings 243 of support leg 245, for example. It will be further appreciated that a width of the separation space 244 is dimensioned such that a portion of the other of the structural interfaces 243, 253 and the respective support legs 245, 255, such as the ring 253 of the support leg 255 for example, is capable of being disposed within the separation space 244. It will be further appreciated that disposition of the anti-friction material 251 upon at least one flange surface 249, 259 will reduce an amount of force required to overcome friction between the flange surfaces 249, 259 of the rings 243, 253.

While an embodiment has been described having one ring 253 of one support leg 255 disposed between rings 243 of another support leg 245, it will be appreciated that the scope of embodiments of the invention are not so limited, and will also apply to bearing support structures 210 that include support legs 245, 255 having alternate positioning arrangements, such as one structural interface beside another, and a portion of each structural interface of each support leg 245, 255 disposed within a separation space of the other structural interface and respective support leg, for example. Further, while an embodiment has been described having circular rings, it will be appreciated that the scope of embodiments of the invention are not so limited, and may also apply to structural interfaces that include alternate geometry.

Referring now to FIG. 5, a lower section view of the bearing support structure 210, including the support legs 245, 255, the bearing housing 220, and the inner barrel 230 disposed fore, or upstream of a flow of exhaust gas, relative to the bearing housing 220 is depicted. It will be appreciated that in an embodiment, a center of the bearing housing 220, represented by a centerline 221, is coincident with the centerlines 252, 262 of the bores 250, 260 of the rings 243, 253. In an embodiment, at least one of the support legs 245, 255 including the respective structural interface 247, 257 will include a pivot, and be capable of rotating relative to the bearing housing 220.

Referring now to FIG. 6, an end view of the bearing support structure 210 is depicted. In an embodiment, the bearing support structure 210 includes two pivot points 610, 615 disposed at respective centers of the pivot supports 246, 256, and a third pivot point 605 disposed at a center of the bearing housing 220. It will be appreciated by one skilled in the art that the three pivot points 605, 610, 615 of the bearing support legs 245, 255, in conjunction with the support surface 55, provide what is referred to as a three-bar linkage. Motion of any one pivot point 605, 610, 615 can effect a motion of two other pivot points 605, 610, 615. For example, assume that the pivot point 615 is attached to the support surface 55 and is not free to translate in response to any external influence and that the pivot point 610 of the pivot support 246 is made to translate in a vertical direction as indicated by direction line 611 to a position 612. In response to the translation of the pivot point 610 in the vertical direction 611, the pivot point 605 will revolve in an arc indicated by direction line 606 about the pivot point 615 to a position 607. Pivot point 615 will not translate, but will exhibit rotation as indicated by direction line 616. Accordingly, a location of the pivot point 605, corresponding to the center of the bearing housing 220, and therefore the center of the rotor of the turbine engine 100, can be defined by appropriate changes in the location of at least one of the pivot points 610, 615 of the corresponding pivot supports 246, 256.

While an embodiment has been described having three pivot points that form a three-bar linkage, it will be appreciated that the scope of embodiments of the invention are not so limited, and that it will also apply to bearing support structures that may include a different number of pivot points, such as one pivot point to form a one-bar linkage, two pivot points to form a two-bar linkage, and four pivot points to form a four-bar linkage, for example.

As a result of material properties of the support legs 245, 255, a change in temperature of the support legs 245, 255, in response to the temperature of the exhaust gasses, is contemplated to result in a change of distance between the pivot points 605, 610 of the bearing support leg 245 and a change of distance between the pivot points 605, 615 of the bearing support leg 255. Accordingly, in response to the pivot points 610, 615 being attached to the support surface 55, the change in temperature of the support legs 245, 255 will result in a change of location of the pivot point 605 relative to the support surface 55. It is contemplated that use of the anti-friction material 251 between at least one of the rings 243, 253 and the bearing housing 220 to reduce an amount of force required to cause rotation between the rings 243, 253 and the bearing housing 220 will thereby reduce a magnitude of stresses within the support legs 245, 255 that results from changes in temperature.

Generally, a change of temperature of components of the turbine engine 100 resulting from operation thereof, will result in a change of clearances surrounding the rotor of the turbine engine 100. Appropriate selection of material of the support legs 245, 255 and location of the centers 610, 615 provides a thermally responsive bearing support structure 210 that is thermally matched to maintain preferred clearances and alignment surrounding the rotor of turbine engine 100. As used herein, the term "thermally matched" shall refer to a bearing support structure 210 that will change in response to temperature in such a manner that clearances surrounding the rotor will remain within desired limits. In an embodiment, concentricity between the rotor and the stator is maintained by one of cooling and heating at least one of the stator case supports 125 and the bearing support legs 245, 255 such that transient and steady state thermal growth results in desired clearance limits. In another embodiment, concentricity between the rotor and stator is maintained by changing the location of at least one of the pivot supports 246, 256, to effect a change in the location of the center of the bearing housing 220. In an embodiment, the change of location of the pivot supports 246, 256 is accomplished by at least one positioning device 650 such as hydraulic or pneumatic pistons, for example. In an embodiment, the positioning device 650 is responsive to a signal representative of at least one of engine temperatures, engine vibrations, and measured engine clearances to maintain desired clearances surrounding the rotor. The signal is provided via turbine engine 100 data measurement systems and methods as will be appreciated by one skilled in the art.

Referring now to FIG. 7, a side cross section view of the bearing support structure 210 is depicted. The direction line 99 indicates the direction of flow of exhaust gasses from the turbine engine 100. The inner barrel 230 includes a double wall bearing cone 730 to shield the bearing from exhaust gasses and provide cooling to the rotor. The inner diffuser 740 is supported by the airfoils 123 of the outer diffuser 120 as described above, and interfaces with the inner barrel 230 via a seal 745. The inner diffuser 740 is disposed radially outward from the center 221 of the bearing housing 220 to shield the bearing housing 220 from the temperature of exhaust gasses in a manner similar to the shielding of the exhaust frame 115 from the temperature of exhaust gasses by the outer diffuser 120. An insulation pack 710 surrounds the bearing housing 220, and is dimensioned so as to reduce a volume of space between the insulation pack 710 and the bearing housing 220. Accordingly, a flow rate of cooling medium, such as air, depicted by an airflow line 720, required for cooling of the bearing housing 220 is reduced. In an embodiment, the inner barrel 230 is attached to the bearing housing 220. In another embodiment, the inner barrel 230 is directly attached to at least one of the support legs 245, 255. In another embodiment, the inner barrel 230 is an integral part of the bearing housing 220. Because support for the inner barrel 230 does not require struts attached to the exhaust frame 115, the size and number of airfoils 123 can be reduced, thereby reducing an aerodynamic efficiency loss associated with the airfoils 123.

As described above, clearances between the rotor and the stator may be changed via adjustments to the location of the pivot supports 246, 256, located externally to the turbine engine 100. Furthermore, use of the bearing support structure 210 disclosed herein will allow such adjustments to be made subsequent to turbine engine 100 assembly. External adjustment of clearances subsequent to assembly is contemplated to reduce turbine assembly time, in-field repair times, and machine-to-machine clearance variation, and to allow for tighter design clearances and efficiency improvement. In an embodiment, a stiffness of the bearing support structure 210 can be tuned by modifying the support leg 245, 255 geometry to enhance a dynamic response of the rotor, and to allow for such dynamic response to meet design intent. Use of the bearing support structure 210 decouples interaction between the rotor and the stator at the aft section 105 of the turbine engine 100 and provides a more direct load path of the rotor to the support surface 55 of the system. As will be appreciated by one skilled in the art, effects of emergency loading events, such as a seismic event or loss of rotating hardware, for example, often result in an increased loading of a flange, such as a flange 111, for example, a slippage of a flange, and additional structural damage. Decoupling the rotor from the stator can reduce the dynamic response that leads to such effects.

The bearing support structure 210 reduces the cooling requirement of the turbine engine 100 by at least one of eliminating structural steel struts to connect the inner barrel 230 to the exhaust frame 115, reducing a volume of space inside the exhaust frame 115 that requires cooling air, and use of the exhaust frame 115 configured with the axial length that terminates upstream of the outer diffuser 120. The reduction in cooling requirements provides a reduction of the auxiliary blower load on the turbine engine 100.

Elimination of struts that support the inner barrel 230, and cooling air flowing between the struts and the airfoils 123, reduces thermal stresses within the outer diffuser 120 and the exhaust frame 115. Cracking of the diffuser 120 and low cycle fatigue of the exhaust frame 115 will be improved as a result of the thermal stress reduction.

In view of the foregoing, use of the bearing support structure 210 facilitates a method of adjusting rotor clearances of the turbine engine 100 attached to the support surface 55. In an embodiment, the method includes adjusting the location of at least one of the support legs 245, 255 in operable communication with the bearing housing 220 and in direct structural connection with the support surface 55. In an embodiment, the adjusting is performed subsequent to assembly of the turbine engine 100. In an embodiment, the adjusting is performed manually by a technician in the field. In another embodiment, the bearing support structure 210 is thermally matched to the turbine engine 100 and the adjusting is responsive to the temperature of the turbine engine 100 by nature of the thermal properties of the support legs 245, 255.

In another embodiment, the method further includes obtaining a signal representative of information relating to at least one of the turbine engine 100 temperature, turbine engine 100 vibration, as may be related to impending or initial rotor interference conditions, and, at least one of measured and derived turbine engine clearance 100 information. The method further includes adjusting the location of the second location 202 of at least one of the support legs 245, 255 via the positioning device 650 responsive to the signal to adjust the rotor clearances of the turbine engine 100.

As disclosed, some embodiments of the invention may include some of the following advantages: an ability to decouple a thermal response of the exhaust frame casing walls and struts from the rotor bearing housing, reducing transient and steady state stresses and enhancing low cycle fatigue performance of the exhaust frame; an ability to reduce cooling requirements of the exhaust frame and eliminate at least one set of blowers, thereby increasing a reliability of the turbine; an ability to reduce machine-to-machine clearance variation during the initial build and in the field by providing external alignment capability; an ability to improve diffuser aerodynamic performance by eliminating struts and reducing airfoil size and count; an ability to reduce a manway count through which cooling piping is run by reducing required cooling to the inner barrel; an ability to decouple mechanical interaction between the rotor and stator and reduce damage to the turbine during emergency loading conditions; an ability to replace the outer diffuser without removing the exhaust frame and thereby reduce an outage duration in response to a need for outer diffuser replacement; an ability to reduce a number of piping systems to reduce both initial field installation and repair times in response to a need for removal of an upper half of the turbine; an ability to reduce manufacturing cost associated with the exhaust frame and associated systems; an ability to access the horizontal joint of the outer diffuser to include a bolted flange; and an ability to reduce cooling inside the airfoils to reduce thermal stresses on the outer diffuser that may lead to outer diffuser cracking.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus to support a rotor of a turbine engine disposed upon a support surface, the apparatus comprising:
   a housing;
   a rotor support bearing disposed within the housing; and
   a support leg including a first support leg and a second support leg in operable communication with the housing and in direct structural connection with the support surface, wherein:
   the first and second support legs respectively comprise first and second structural interfaces in operable communication with the housing, at least one of the first and second structural interfaces comprising a separation space and a portion of the other of the first and second structural interfaces being disposed within the separation space.

2. The apparatus of claim 1, wherein the support leg comprises:
   a structural interface in operable communication with the housing at a first location; and
   a pivot disposed at a second location.

3. The apparatus of claim 2, wherein the structural interface comprises at least one of:
   a circular bore; and
   a pivot.

4. The apparatus of claim 3, wherein:
   the circular bore comprises anti-friction material disposed thereupon.

5. The apparatus of claim 3, wherein:
   the structural interface comprises at least one flange surface projecting radially outwardly from the circular bore; and
   at least one flange surface comprises anti-friction material disposed thereupon.

6. The apparatus of claim 1, wherein:
   at least one of the first structural interface and the second structural interface comprise a circular bore.

7. The apparatus of claim 1, wherein:
   the first support leg comprises a plurality of pivots;
   the second support leg comprises a plurality of pivots; and
   the first support leg, the second support leg, and the support surface define a three-bar linkage.

8. The apparatus of claim 1, further comprising:
   an inner barrel disposed upstream of the housing, the inner barrel in structural connection with at least one of the housing and the support leg.

9. A turbine engine system for disposing upon a support surface, the turbine engine system comprising:
   a stator;
   a rotor disposed within the stator;
   a rotor support bearing in operable communication with the rotor;
   a housing surrounding the rotor support bearing; and
   a support leg including a first support leg and a second support leg in operable communication with the housing and in direct structural connection with the support surface, wherein:

the first and second support legs respectively comprise first and second structural interfaces in operable communication with the housing, at least one of the first and second structural interfaces comprising a separation space and a portion of the other of the first and second structural interfaces being disposed within the separation space.

10. The system of claim 9, wherein the support leg comprises:
a structural interface in operable communication with the housing at a first location; and
a pivot disposed at a second location.

11. The system of claim 10, wherein the structural interface comprises at least one of:
a circular bore; and
a pivot.

12. The system of claim 11, wherein:
the circular bore comprises anti-friction material disposed thereupon.

13. The system of claim 11, wherein:
the structural interface comprises at least one flange surface projecting radially outwardly from the circular bore; and
at least one flange surface comprises anti-friction material disposed thereupon.

14. The system of claim 9, wherein
at least one of the first structural interface and the second structural interface comprise a circular bore.

15. The system of claim 9, wherein
the first support leg comprises a plurality of pivots;
the second support leg comprises a plurality of pivots; and
the first support leg, the second support leg, and the support surface define a three-bar linkage.

16. The system of claim 9, further comprising:
an inner barrel disposed upstream of the housing, the inner barrel in structural connection with at least one of the housing and the support leg.

* * * * *